United States Patent
Alekseevich et al.

(10) Patent No.: US 7,555,897 B2
(45) Date of Patent: Jul. 7, 2009

(54) INDEPENDENT SYSTEM OF ENERGY AND HEAT SUPPLY

(75) Inventors: Alexander N. Alekseevich, St. Petersburg (RU); Viktor V. Tsarev, St. Petersburg (RU)

(73) Assignee: Infinite Power Corporation, Marlborough, MA (US)

( * ) Notice: Subject to any disclaimer, the term of this patent is extended or adjusted under 35 U.S.C. 154(b) by 723 days.

(21) Appl. No.: 11/387,251

(22) Filed: Mar. 23, 2006

(65) Prior Publication Data

US 2006/0168961 A1    Aug. 3, 2006

Related U.S. Application Data

(63) Continuation of application No. PCT/IB2004/051858, filed on Sep. 24, 2004.

(30) Foreign Application Priority Data

Sep. 24, 2003    (RU) .............................. 2003128510

(51) Int. Cl.
*F16D 31/02*    (2006.01)

(52) U.S. Cl. ...................... 60/398; 60/641.2; 60/641.8; 290/55

(58) Field of Classification Search ................... 60/398, 60/641.2, 641.15; 290/4 R, 4 C, 55
See application file for complete search history.

(56) References Cited

U.S. PATENT DOCUMENTS

| 4,206,608 | A   | 6/1980  | Bell |
| 4,379,972 | A   | 4/1983  | Sosa et al. |
| 6,510,687 | B1* | 1/2003  | Zaslavsky et al. ............. 60/398 |
| 6,532,740 | B1* | 3/2003  | Sullivan ................... 60/641.11 |
| 6,647,717 | B2* | 11/2003 | Zaslavsky et al. ............. 60/398 |
| 6,862,886 | B2* | 3/2005  | Stewart ..................... 60/641.2 |

FOREIGN PATENT DOCUMENTS

| DE | 3407881  | 9/1985 |
| DE | 10156873 | 5/2003 |
| FR | 2405378  | 5/1979 |
| JP | 58047177 | 6/1983 |
| JP | 11237138 | 11/1999 |

\* cited by examiner

*Primary Examiner*—Hoang M Nguyen
(74) *Attorney, Agent, or Firm*—Houston Eliseeva LLP (57) ABSTRACT

The invention concerns devices of power supply and is intended for independent energy, heat and hot water supply of living and industrial premises. The system of independent energy and heat supply of living and industrial premises contains wind generator setup for electric power production 1, connected with electric energy consumers; the electric energy accumulator 2 connected with the wind generator by setup 1 and electric energy consumers; setup for solar into thermal energy transformation 3 and the thermal accumulator 4, connected with thermal energy consumers.

10 Claims, 6 Drawing Sheets

INDEPENDENT SYSTEM OF ENERGY AND HEAT SUPPLY

RELATED APPLICATIONS

This application is a Continuation of PCT application Ser. No. PCT/IB2004/051858 filed on Sept. 24, 2004 which in turn claims priority to Russian application Ser. No. RU2003128510 filed on Sept. 24, 2003 both of which are incorporated herein by reference in their entirety.

FIELD OF THE INVENTION

The invention concerns power supply devices and is intended for independent energy, heat and hot water supply of living and industrial premises.

BACKGROUND OF THE INVENTION

Independent systems of combined production of electric energy and heat are well known. A basic element of such systems is the diesel engine, which produces electric energy. Diesel engines are equipped with heat exchanging devices, which allow using the heat of a cooling liquid of the engine and the heat of its exhaust gases for consumer heating. The main disadvantage of the existing systems is environmental contamination by exhaust gases, high cost price of energy, and also possible failures because of bad quality of fuel or its absence.

Power supply systems, developed for installations of non-polluting renewable energy sources (such as wind, sun, etc.) are also known. However, instability of energy stream in a source (changes of wind, climatic and seasonal fluctuations of light energy streams) leads to problems of maintenance of quality energy supplied to the consumer. For fitting fluctuations in a generated energy power caused by instability of the stream of energy in a source, and its coordination with a mode of power consumption, accumulators of energy are used. Independent power setups for the renewable energy source, including converters of energy from a renewable source into electric energy, such as electrical storage batteries, thermal accumulators, and electro technical devices for energy redistribution between electric accumulators and thermal accumulators are known.

Features conterminous to the essential features of the present invention are as follows: an energy converter from renewable sources into electric energy, electro storage batteries, and thermal accumulators. The main disadvantage of the stated system is the insufficient efficiency of setup connected with losses of energy during its double transformation: energy of renewable source—into electric energy, electric energy—into thermal energy.

A device for independent energy and heat supply for agricultural consumers, which is rather comparable with the present invention by a set of the essential attributes, chosen to be a prototype, is known. This device contains a gas thermoelectrogenerator; a wind-energy unit; an electricity accumulator; which are setup for solar energy into heat transformation; and a heat accumulator. A wind-energy unit is connected through an automatic switching device to the thermoelectrogenerator and to the electricity accumulator, which is connected to the electric energy consumer. The solar setup is connected with a thermoelectrogenerator and heat accumulator, the heat accumulator is connected to the heat consumer.

Features of the prototype, conterminous to essential features of the present useful model, are: a wind-energy unit connected with an electric energy consumer; a setup for solar energy into heat transformation, connected with the heat consumer; the thermal accumulator connected with the solar setup and heat consumer; the electric accumulator connected with a wind-energy unit and the electric power consumers.

The necessity of gas as one of the basic energy sources used makes operation of the known device dependent from a given kind of a fuel resource presence, and leads to problems with its delivery, storage, and environmental contamination. Besides, the device is characterized as being complicated in operation, which reduces the reliability and efficiency of its operation. The other disadvantage of the device is the absence of energy recycling of the so-called "waste" heat and non-use of environmental and Earth heat that reduces its economic feasibility.

The problem, to which the present invention is directed, is to increase the reliability and profitability of the independent power supply of buildings and constructions facilities.

SUMMARY OF THE INVENTION

The technical result achievable as a result of use of the present invention, consists of an increase of an overall performance of the system independent power supply for premises due to use of an additional energy source as the heat-pump, heat, automation of processes of control and management, optimization of distribution of loading between elements of the system, and the use of low-potential energy of the ground and recycling of the "waste" heat energy of sewage.

The specified technical result is achieved because the independent energy and heat supply of living and industrial premises system contains a wind generator setup for electric power production, connected to the electric energy consumers; the electric energy accumulator connected with the wind-generator setup and the electric energy consumers; a setup for solar energy into thermal energy transformation and the thermal accumulator, connected with the thermal energy consumers; a wind generator setup operated heat-pump connected with the thermal energy consumers; an inverter, through which the electric energy accumulator is connected to the electric power consumers; a recycler sewage heat recycler; a collector of the Earth heat and an automatic control system of the independent power supply, connected through gauges of thermal and electric loadings with executive mechanisms. The setup for solar energy into thermal energy transformation contains a block of solar collectors connected by a heat-carrier to, at least, two heat-exchangers, at least one of which is located to the thermal accumulator, and another—in heat exchanging device connected by the heat-carrier to the Earth heat collector. The heat-pump contains: a wind generator setup operating a compressor, at least, two remote evaporators, one of which is built into the heat exchanging device connected by the heat-carrier to a the Earth heat collector, and the other remote evaporator is built into the sewage heat recycler, and, at least, two remote condensers, one of which is built in a tank of hot water, and the second remote condenser is built in a heat exchanging device connected by the heat-carrier to thermal energy consumers. It is preferable, that the system of independent energy and heat supply contained connected with the automatic control system gauge of external air temperature, the gauge of heat-carrier temperature is put on the input of thermal energy consumers network, the gauge of hot water temperature in a tank, the gauge of sewage temperature in sewage heat recycler, the gauge of heat-carrier temperature in thermal accumulator. In special cases the system of independent energy and heat supply can contain gauge—regulation of the electro supply and electric accumulator's condition. It is preferable, that the system of independent energy and heat supply contains circulating pumps, which are carrying out heat-carrier circulation in the system circuits. It is preferable also that the system containes valves and that the three-running gates regulating the heat-carrier streams in system circuits. In some special cases of the installation of the present invention the thermal accumulator can be implemented as a as a thermo isolated capacity with water. The present system can contain for performance extra tanks of heat-carriers in some cases, at least, one of which can be located in a heat-carrier circuit of solar collector, and another—in a thermal accumulator. It is preferable, that the system of independent energy and heat supply contains a separate accumulator of electric power for an automatic control system. In special cases, performance accumulators of electric power can be implemented as storage batteries. It is preferable, that as heating devices in the system of independent energy and heat supply that the system "warm floors" is used.

In all cases that the execution of the suggested invention differs from the mentioned above known device closest to it in the further described ways:

Presence of a wind generator operating a heat-pump connected with thermal energy consumers;
Presence of an inverter through which electric energy accumulator is connected with consumers of electric power;
Presence of a sewage heat recycler;
Presence of an Earth heat collector;
Presence of an automatic control system of system of independent power supply;
Presence of gauges for thermal and electric loadings;
Presence of the executive mechanisms connected through gauges of thermal and electric loadings with an automatic control system.
Execution of a setup for solar into thermal energy transformation containing the block of solar collectors connected by the heat-carrier, with two heat—exchangers, at least, one of which is located in the thermal accumulator, and another heat exchanging device connected with the Earth heat collector by the heat-carrier;
Execution of a heat-pump containing wind generator setup operating compressor, two remote evaporators, at least, one of which has a built-in heat exchanging device connected to solar energy collectors and an Earth heat collector and other remote evaporators within a built-in sewage heat recycler by the heat-carrier, two remote condensers at least, one of which is a built-in a tank of hot water, and wherein the second remote condenser is a built-in heat exchanging device connected with thermal energy consumers by the heat-carrier.

In special cases the present device differs from known devices, in the further described ways:

The Presence of an automatic control system gauge of external air temperature, the gauge of heat-carrier temperature on an input of thermal energy consumers network, the gauge of temperature in a tank of hot water, the gauge of sewage temperature of in sewage heat recycler, the gauge of heat-carrier temperature in the thermal accumulator;
Presence of a gauge-regulator of electro supply and electric power accumulator's condition;
Presence of the circulating pumps, which are carrying out heat-carrier circulation in system circuits;
Presence of valves and the three-running gates regulating heat-carrier streams in system circuit;"
Execution of a thermal accumulator as thermo isolated capacity with water;
Presence of extra tanks of heat-carriers, at least, one of which is located in a heat-carrier circuit of solar collector, and another—in thermal accumulator;
Presence of a separate electric power accumulator for an automatic control system;
Performance of electric power accumulators as storage batteries;
Use of system "warm floors" as a heating device
Use of a heat-pump allows receiving an additional source of thermal energy and raises overall performance of the system of independent power supply. Presence of sewage heat recycler and the Earth heat collector, and also execution of the heat-pump containing the wind generator-operating compressor; the remote evaporators built-in heat exchanging devices, connected carrier with the collectors of sun and earth thermal energy and sewage heat recycler by the heat; the remote condensers built-in a tank of hot water and heat exchanging device, connected with thermal energy consumers by the heat carrier, allows the use of thermal energy of the solar setup most rationally and provides for the recycling of "waste" heat and use low potential energy of the Earth.

Use of the automatic control systems connected through gauges of thermal and electric loadings with executive mechanisms, allows optimizing loading between separate elements of the system, and improves the control over its operation and raises reliability of the system of independent power supply. Connection of electric energy accumulator s through the inverter to the electric power consumer's network, and use of the additional electric power accumulator as a source of automatic control system power supply, allows users to increase system reliability and to exclude failures in the power supply, caused by adverse weather and climatic conditions. Use of the system "warm floors" as heating devices provides optimum use of thermal energy and reduces thermal losses.

BRIEF DESCRIPTION OF THE DRAWINGS

The suggested invention is illustrated by the circuit drawings submitted on FIGS. 1-6.

DETAILED DESCRIPTION OF THE PREFERRED EMBODIMENTS

The system of independent energy and heat supply for living and industrial premises contains a wind generator setup for electric power production, connected to electric energy consumers; an electric energy accumulator 2 connected to a wind generator setup 1 and electric energy consumers; a setup for solar into thermal energy transformation 3 and a thermal accumulator 4, connected to thermal energy consumers; a wind generator 1 operating heat-pump 5 connected to thermal energy consumers; an inverter 6, a sewage heat recycler 7; an Earth heat collector 8; and an automatic control system 9. The electric energy accumulator 2 is connected to electric power consumers through the inverter 6. The setup for energy transformation from solar into thermal energy 3 contains a block of solar collectors 10 connected by a heat-carrier with at least two heat exchangers 11, 12. Heat exchanger 11 is located in the thermal accumulator 4. Heat exchanger 12 is located in the heat exchanging device 13 connected to the Earth heat collector 8 by the heat carrier. The heat-pump 5 contains a compressor 14; and at least two remote evaporators 15, 16; and, at least, two remote condensers 17, 18. The compressor 14 is operated by a wind generator setup 1. The remote evaporator 15 is a built-in heat exchanging device 13 connected by the heat carrier to the Earth heat collector 8. The remote evaporator 16 is a built-in sewage heat recycler 7. The remote condenser 17 is a built-in a tank of hot water 19, and the remote condenser 18 is built-into heat exchanging device 20 which is connected to thermal energy consumers by the heat carrier. Circulation of the heat-carrier in the setup circuit for solar into thermal energy transformation 3 is carried out with the circulating pumps 21. Circulation of the heat-carrier in a circuit thermal accumulator 4—thermal energy consumer's network carries out the circulating pump 22. Circulation of the heat-carrier in a circuit low potential energy collector (heat of the Earth) 8 to heat-exchanging device 13 is provided by the circulating pump 23. The device contains gauges for thermal loading, including: gauge 24 for external air temperature, gauge 25 for the heat-carrier temperature at the input of the heating devices, gauge 26 for the temperature of the tank of hot water 19, gauge 27 for the temperature of the sewage in sewage heat recycler 7, and gauge 28 for the heat-carrier temperature in the thermal accumulator 4. Control over electric power accumulator 2 and regulation of electricity supply in the system of independent energy and heat supply can be carried out with the help of a gauge—regulator 29. The system contains mechanisms for regulating the heat-carrier streams of the system circuits, including: three-running gate 30 regulating the submission of the cold and hot heat-carrier in the consumer's network; a valve for thermal energy accumulation mode inclusion 31; a valve for heating mode inclusion 32; the three-running gate 33 regulating the heat-carrier submission of a solar collector in the thermal accumulator 4 and heat exchanging device 13 connected with the Earth heat collector 8. Through gauges 24-28 of thermal and electric 29 loadings the automatic control system 9 is connected with executive mechanisms—circulating pumps 21-23; three-running gates 30, 33; and valves 31, 32. The thermal accumulator 4 can be implemented as a thermo isolated capacity with water. The system of independent energy and heat supply can contain an extra tank 34 located in solar collector 10 circuits, and an extra tank 35 located in thermal accumulator circuit 4. It is preferable, that the present system contains an additional electric power accumulator (not shown), serving as a source of power supply for an automatic control system 9. Accumulators of electric power can be implemented as storage batteries. It is preferable, that as devices of the heating system "warm floors" are used.

The present system of independent energy and heat supply of living and industrial premises functions as follows.

Electricity Supply System

Figure 2:
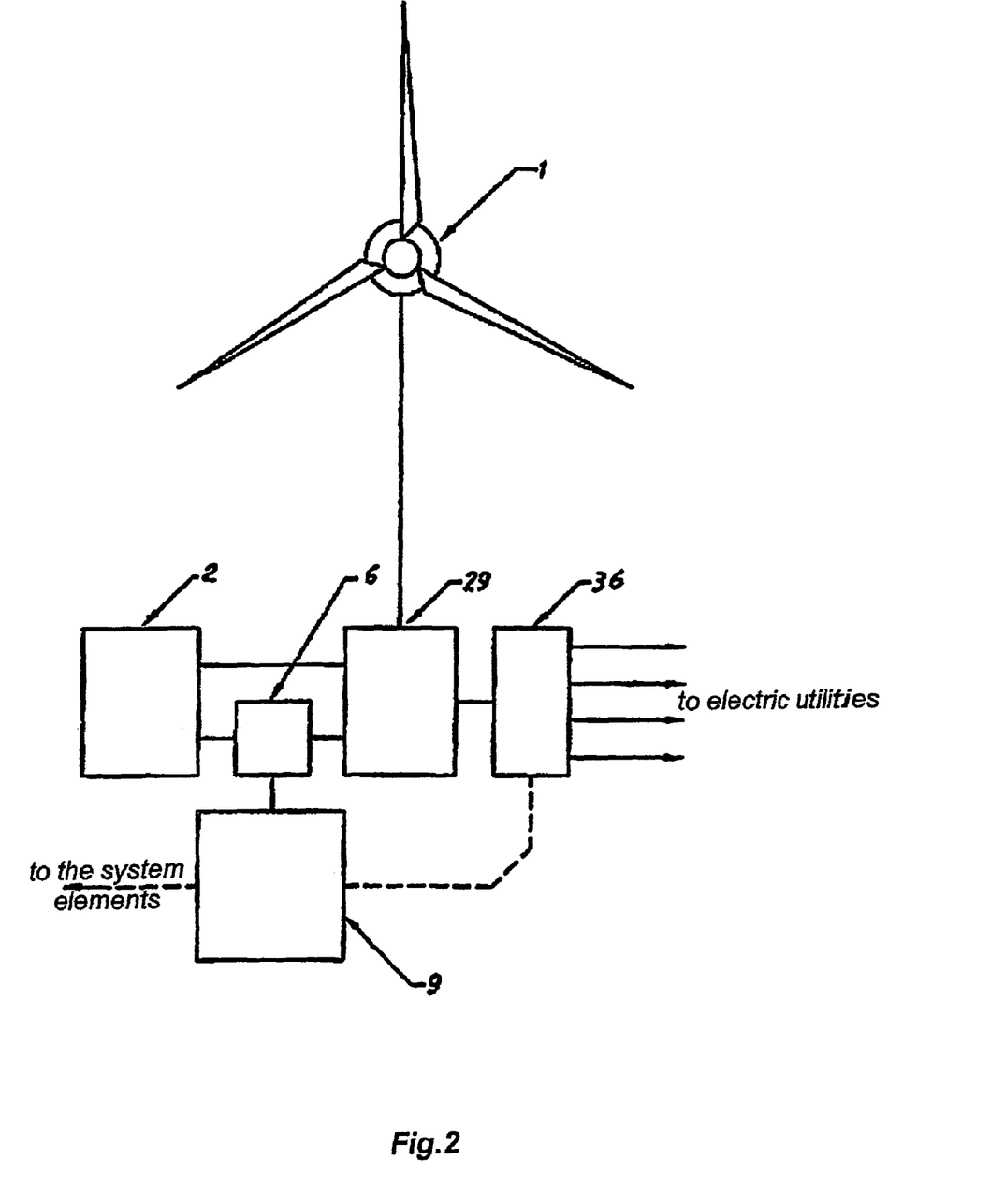
FIG. 2 is a circuit drawing of the system of independent energy and heat supply of living and industrial premises, a contour of wind a generator setup is submitted.

The basic source of the electric power for maintenance of system operations for heating, hot and cold water supply, and also energy supplementation of household devices is the wind generator setup 1. Uninterrupted operation of supply is provided due to the use of the storage battery 2. Management of the power supply system is carried out by automatic control system 9 through a gauge—regulator 29 providing control over the conditions of storage batteries 2 and regulation of system electricity supply. In case of storage batteries 2 discharge regulator 29 provides submission of electric power on additional charge of the storage battery 2. In case of lack of developed energy (for example, a weak wind) the regulator 29 provides submission of missing energy from the storage battery 2 into the consumer's network through the inverter 6, converting a direct current voltage of the storage battery 2 into alternating current voltage.

Heating System

Figure 3:
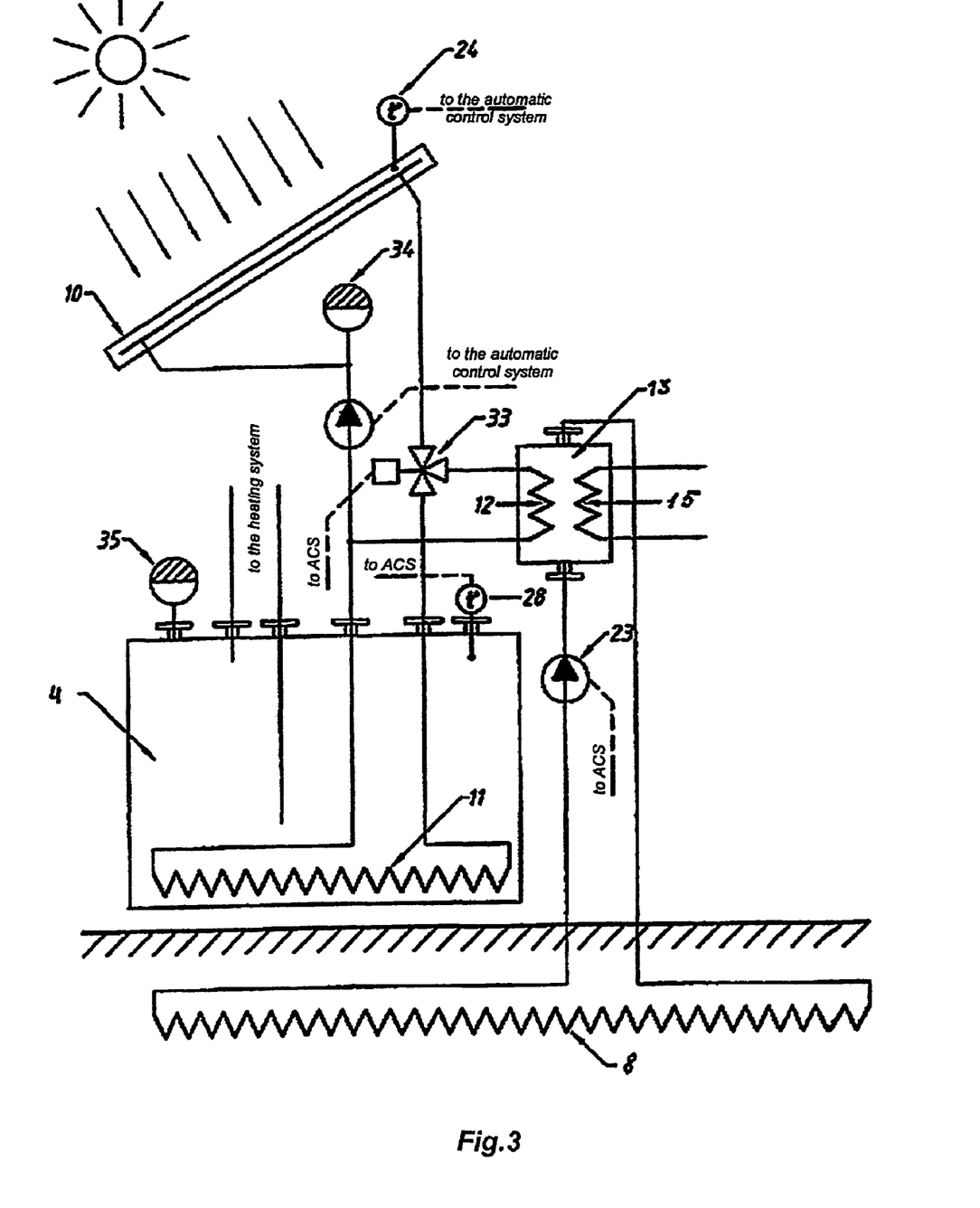
FIG. 3 is a circuit drawing of the system of independent energy and heat supply of living and industrial premises, a contour of the setup for solar energy transformation is submitted.

The basic source of heat is the setup for solar to thermal energy transformation 3. The heat-carrier, for example, antifreeze that is heated up in solar collectors 10, transfers heat through heat exchanger 11 to the heat-carrier in the thermal accumulator 4. Circulation of the heat-carrier in the setup for solar into thermal energy transformation 3 circuit is carried out with the pump 21. Depending on the indications of gauge 24 of external air temperature and the gauge 28 of heat-carrier temperature in the thermal accumulator 4, the following operating modes are possible: a) when the temperature detected on the gauge 24 is greater than the temperature detected on the gauge 28, the pump 21 is constantly turned on and the heat-carrier continuously circulates on a contour; b)) the temperature detected on the gauge 24 is less or equal to the temperature on the gauge 28, then the pump 21 is switched off, the system switches into an expectation mode. As the temperature in a solar collector 10 reaches $28+\Delta°$ C., the pump 21 is turned on; c) when the temperature on the gauge 21 is greater than $90°$ C. and the temperature of the gauge 28 is greater than the temperature detected on the gauge 28, the three-running valve 33 switches a solar collector 10 onto heat exchanger 12 and turns on pumps 21, 23 that provide dump of excessive heat into the ground. Circulation of the heat-carrier between the thermal accumulator 4 and the heating devices is carried out with the pump 22. As heating devices, a system of "warm floors", which surpasses traditional "radiators" in heat exchange rate, are used. Additional sources of thermal energy at functioning wind generator 1 is the heat-pump 5 which is carrying out also, in case of need, extra heating of the heat-carrier supplied in the thermal energy consumer's network.

Figure 4:
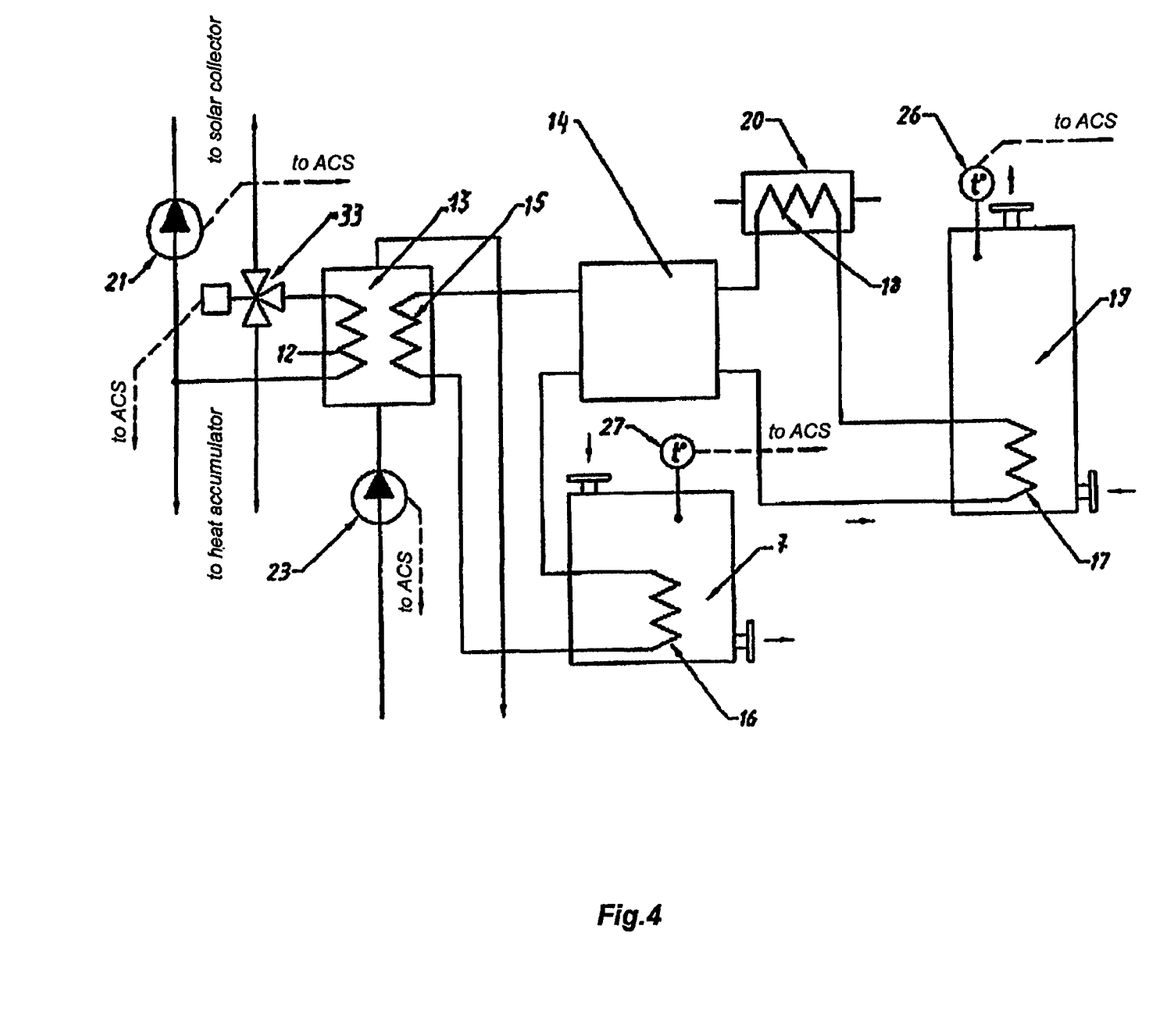
FIG. 4 is a circuit drawing of a system for independent energy and heat supply of living and industrial premises, a contour of the heat-pump is submitted.
Figure 5:
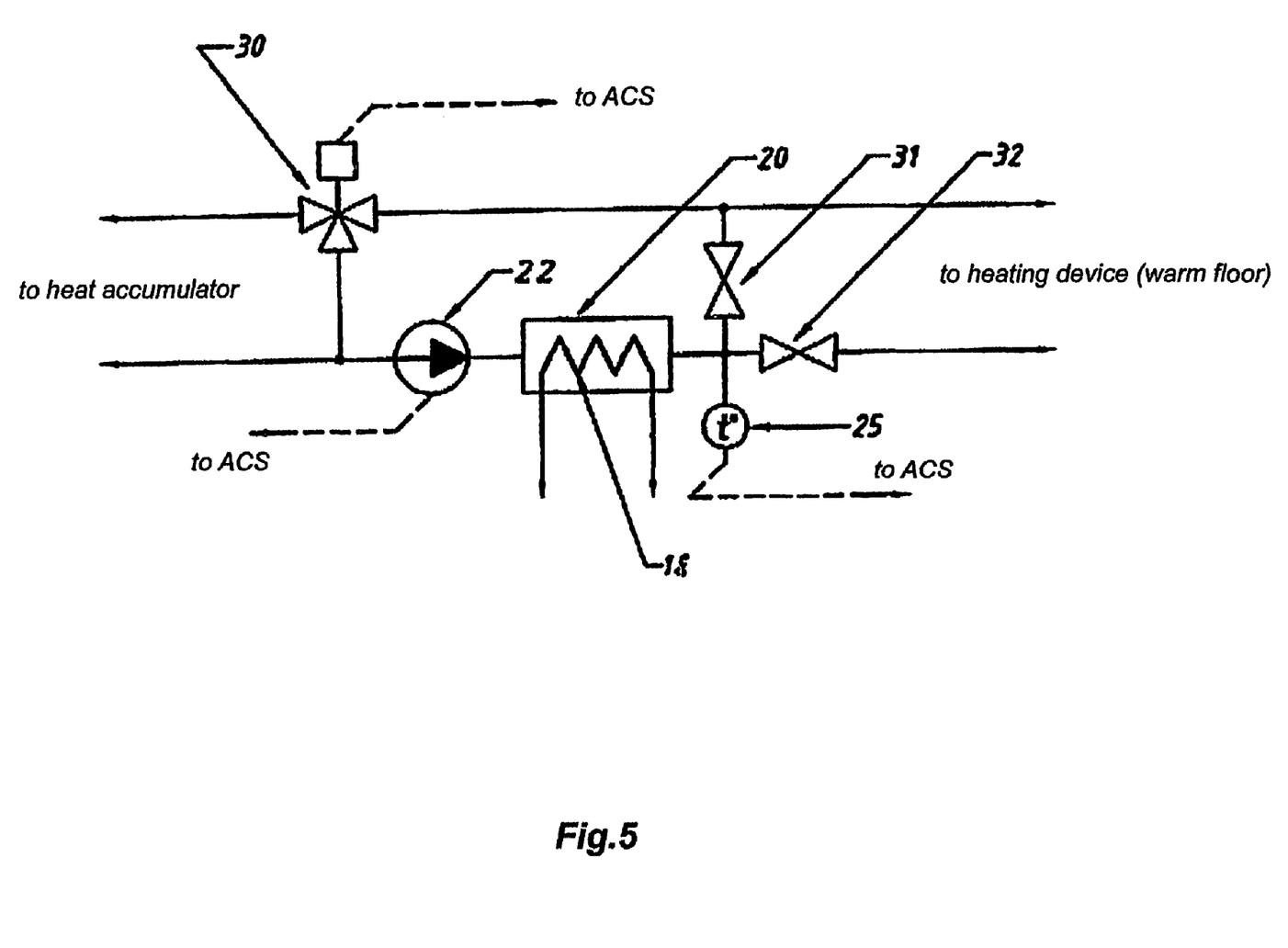
FIG. 5 is a circuit drawing of system for the independent energy and heat supply of living and industrial premises, a contour of the heat-carrier in an output to heat consumers is submitted.

During a warm time of the day or year (summer period) heat accumulation in the thermal accumulator 4 occurs, thus the heating devices are switched—off; the valve 31 is open, and the valve 32 is closed. If the temperature in the thermal accumulator 4 is lower than $60°$ C. (at absence of the sun or at night) the pump 22 providing heat-carrier circulation for the thermal accumulator 4 through heat exchanging device 20 in which the condenser 18 of heat-pump 5 providing heating is built switches on.

In a cold season (the winter period) feedback of saved up heat in the consumer's network is carried out. Heating devices are switched on, the valve 31 is closed, and the valve 32 opens. Operation of the heating system is supervised by the automatic control system 9. Circulation of heat-carrier between the thermal accumulator 4 and the heating devices is carried out with the pump 22. The temperature in the heating devices input is established depending on the temperature of external air and supervised by the temperature gauge 25. Adjustment and maintenance of necessary temperature is controlled with AMS three running gate 30 by mixing the heat-carrier from a return collector to the system input. When heat-pump 5 is in operation, the temperature in heat exchanger 20 system output raises. Compensation for gain temperature is carried out by means of the gate 30 controlled by the AMS, increasing a part of the "returning" cold heat-carrier to an input heat exchanger 20, and "hot" from the thermal accumulator 4 decreases and, in the certain conditions, can stop completely. This allows an economic consumption of the thermal energy of the accumulator 4.

Hot Water Supply System

The functioning of the hot water supply system is provided by the heat-pump 5. At a temperature in the tank of hot water of below certain value that is fixed by the gauge 26, the heat-pump 5 and the pump 23 of heat-carrier circulation in the circuit start operating, formed by a collector of the Earth heat 8 placed in the ground, and by heat exchanging device 13 where there is a selection of heat by the evaporator 15, and its transfer through the condenser 17 to water in a tank. In the afternoon at switching the heat-pump 5 on, solar collector 10 becomes a source of heat that essentially raises the efficiency of the process of preparation of hot water. The three-running valve 33 switches a solar collector on heat exchanger 12, which exchanger 12 is built-in heat exchanging device 13, where the heat is transferred to evaporator 15 through the heat-carrier filling heat exchanger 12 without turning the pump 23 on.

An additional heat source for hot water production is sewage heat recycler 7. Before being dumped in the water drain, waste water gets in recycler 7 where there is a selection of heat by the evaporator 16 heat-pumps 5 and its return through the condenser 17 in to? a tank of hot water 19. Recycling of heat from the sewage allows lowering of expenses for preparation of hot water by 80%.

Power Supply System Management

Figure 1:
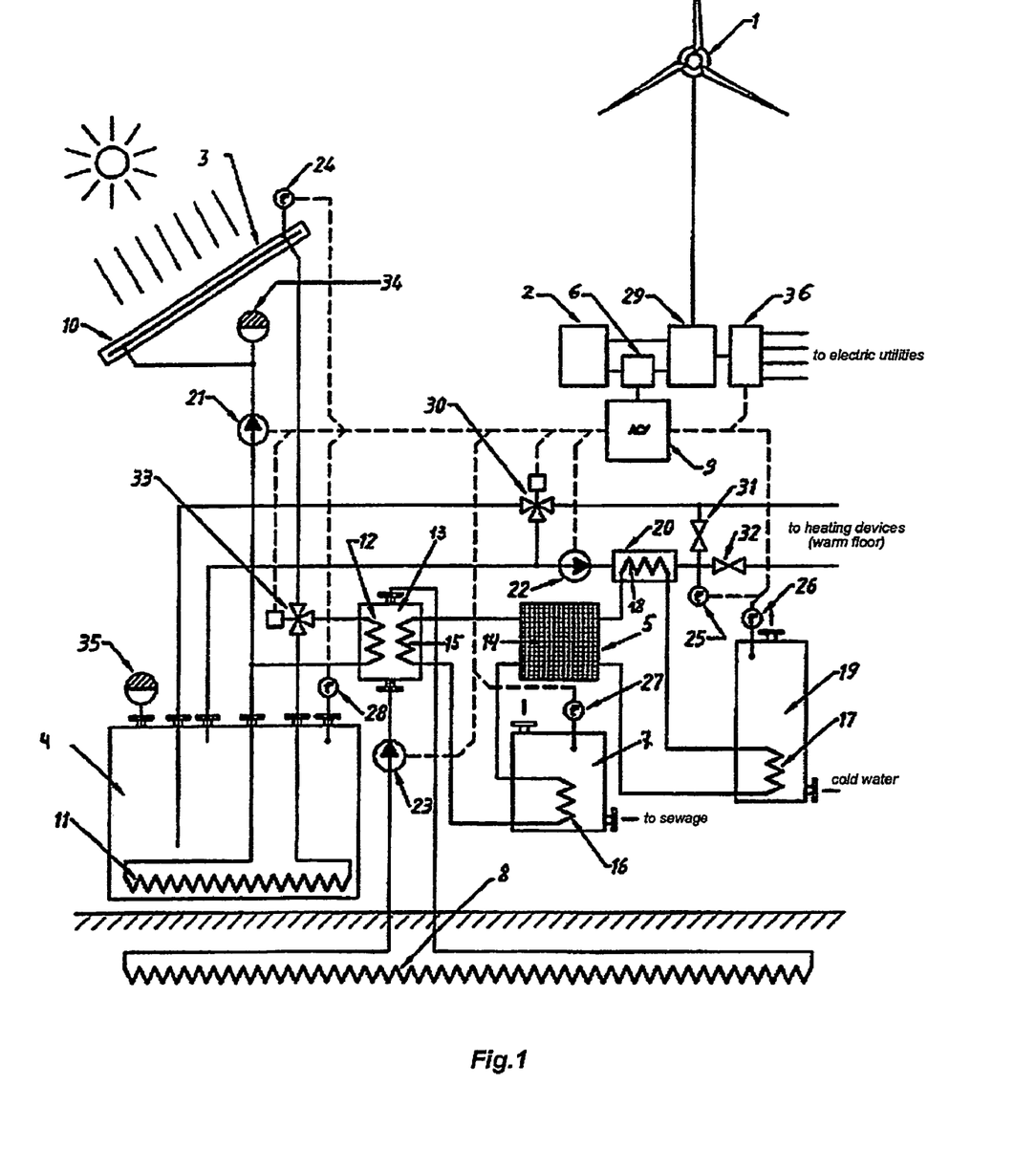
FIG. 1 is a circuit drawing of the system of independent energy and heat supply of living and industrial premises, a general view is submitted.

The power supply system management is fully automated. The automatic control system 9 functions on the basis of a COMPUTER with the corresponding software. Signals from gauges 24-29 are transmitted to the system input: The received information is processed and an algorithm of the behaviour of all elements of the system is defined. Then an output of the AMS signals for the switchboard 36, basic system devices manager, is produced. An AMS supply is carried out from the separate storage battery (not shown).

Ventilation and Conditioning System

Figure 6:
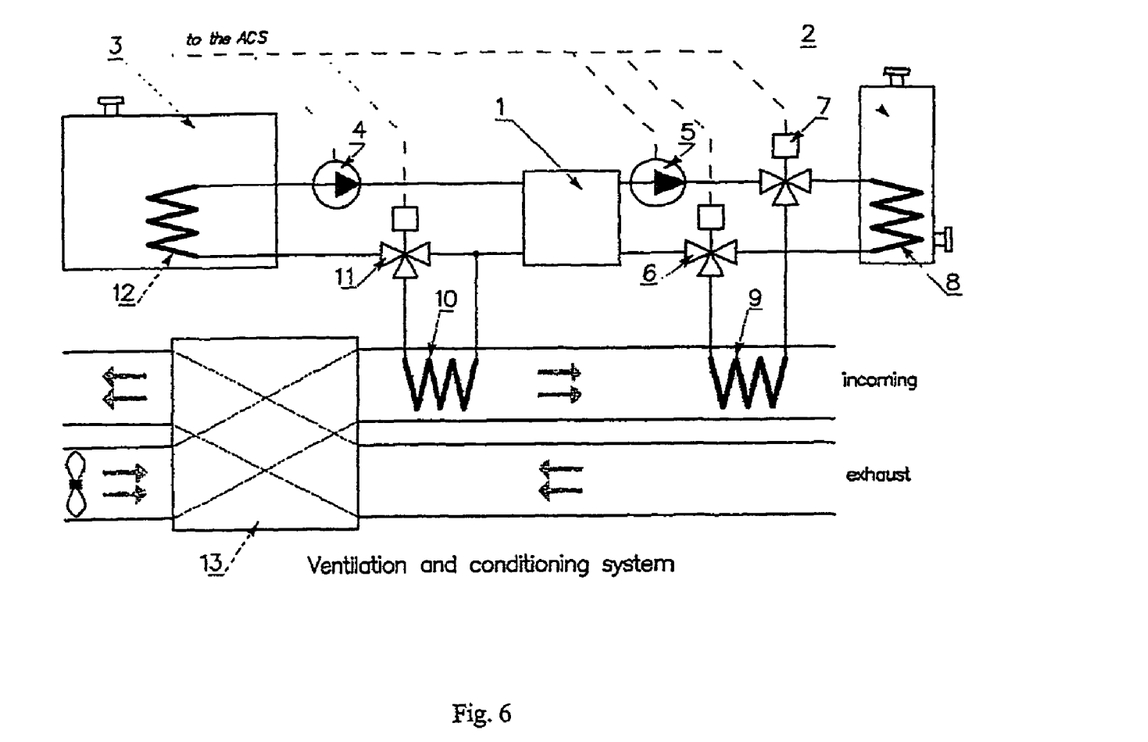
FIG. 6 is a schematic diagram of the ventilation and conditioning systems.

In the climate conditions of lower latitude territories, where the average annual temperature is always above 0 Centigrade ,and very hot in summer, the system works in "reverse" mode, when "cold" is produced, stored and distributed instead of the "heat". In this case the initial system with some changes is illustrated in FIG. 6, wherein 1 is a heat pump; 2—hot water tank; 3—cold accumulator; 4,5—circulation pump; 6,7,11—three-way valve; 8-10,12—heat exchanger; 13—recuperator.

1. The heat accumulator will function as accumulator of cold. The accumulator is supposed to be filled with water. We use the hidden energy capacity of the phase transfer(ice-wa Let us calculate the quantity of energy, required for cooling of 1 $M^3$ (m=1000 Kg)of water with initial temperature $t_1$=+20° C. up to $t_2$=−20° C.:

$$Q=c_w m(t_1-0)+q_{w-i}m+c_i m(0-t_2)=84+340+42=466 \text{ MJ} \approx 130 \text{ kW·h}$$

where $c_w$=4200 J/kg·° C.—water heat capacity;
$c_i$=2100 J/kg·° C.—ice heat capacity;
$q_{w-i}$=340 000 J/kg—energy of the phase transfer(meaning that for melting of one kilogram of ice at 0° C. is required 340 000 J of heat and vice versa).

2. The heat pump 1 in the cold season will extract(direct mode) the heat from accumulator by means of heat exchanger (cooling water in it) and direct it in the system of hot water supply by heat exchanger 8 and conditioning (heat exchanger 9).At the reverse mode of the system operation the complex of conditioning and ventilation with recuperation 13 is use. In this case the system does not require heating elements— "warm floor" and sewage heat utilization unit.

During hot season the cold stored during winter is used for cooling of incoming air (heat exchanger 10) that allows to unload the electricity supply system especially during dead calm wind periods.

In the climate conditions where the average temperature gradient of outside air is constant in winter and summer seasons:

$$t_{is}-t_{20} \approx t_{20}-t_{iw}$$

where:

$t_{is}$—average summer season outside temperature of air;
$t_{20}$—temperature inside the house;
$t_{iw}$—average winter season outside temperature of air;

The full power of the heat pump will be used only in winter season, and in summer it will be used only for the hot water production. Therefore in this case the air-conditioning electricity consumption is cut two times.

3. The photovoltaic panels are installed instead of the solar heat collectors, thus increasing the reliability of the electric system and decreasing the capacity of the electric accumulator batteries.

What is claimed is:

1. A system of independent energy and heat supply for living and industrial premises, comprising:

a wind generator setup for the electric power production, connected to electric energy consumers;

an electric energy accumulator connected to the wind generator setup and electric energy consumers;

a setup for solar into thermal energy transformation and a thermal accumulator, connected with thermal energy consumers featuring in addition wind generator operating heat-pump connected with thermal energy consumers;

an inverter, through which electric energy accumulators are connected with electric power consumers;

a sewage heat recycler;

an Earth heat collector and an automatic control system for an independent power supply, connected through gauges of thermal and electric loadings with executive mechanisms; and wherein the setup for energy transformation from solar into thermal energy contains a block of solar collectors connected by heat-carrier, at least, with two heat exchangers, one of which is located in the thermal accumulator, and another one in a heat exchanging device connected with the Earth heat collector by a heat carrier; the heat-pump contains wind generator operating compressor and, at least, two remote evaporators, one of which has a built-in heat exchanging device connected with the Earth heat collector by the heat carrier, and the other remote evaporator has a built-in sewage heat recycler, and, at least, two remote condensers, one of which is built-in a tank of hot water, and the second remote condenser is built-in a heat exchanging device connected to thermal energy consumers by the heat carrier.

2. The system of independent energy and heat supply according to claim 1, further comprising an external air temperature gauge, a heat-carrier temperature gauge, at the input of a thermal energy consumers network, a gauge for temperature in a tank of hot water, a gauge for temperature of sewage in the recycler, and a heat-carrier temperature gauge in the thermal accumulator.

3. The system of independent energy and heat supply according to claim 1, further comprising a gauge-regulator of electricity supply and accumulators of the electric power condition.

4. The system of independent energy and heat supply according to claim 1, further comprising circulating pumps that are carrying out circulation of the heat-carrier in the system circuits.

5. The system of independent energy and heat supply according to claim 1, further comprising valves and a three-running gates regulating streams of the heat-carrier in the system circuits.

6. The system of independent energy and heat supply according to claim 1, wherein the thermal accumulator is implemented as a thermally insulated water filled reservoir.

7. The system of independent energy and heat supply according to claim 1, further comprising extra tanks, at least one of which extra tanks is disposed in the heat circuit of the solar connector, and another extra tank in the thermal accumulator.

8. The system of independent energy and heat supply according to claim 1, further comprising a separate electric power accumulator for an automatic control system.

9. The system of independent energy and heat supply according to claim 1, wherein the accumulators of electric power are implemented as storage batteries.

10. The system of independent energy and heat supply according to claim 1, further comprising warm floors as a heating device.

* * * * *